United States Patent
Dahl et al.

(10) Patent No.: US 10,549,228 B2
(45) Date of Patent: Feb. 4, 2020

(54) FILTRATION, FILTER CHARACTERIZATION, AND METHODS AND APPARATUSES THEREFOR

(71) Applicant: Seagate Technology LLC, Cupertino, CA (US)

(72) Inventors: Brian T. Dahl, Minnetonka, MN (US); Paul A. Beatty, Fort Collins, CO (US); Sumit Chandra, Longmont, CO (US); Jeffrey James Croxall, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 296 days.

(21) Appl. No.: 15/351,094

(22) Filed: Nov. 14, 2016

(65) Prior Publication Data
US 2017/0136396 A1 May 18, 2017

Related U.S. Application Data

(60) Provisional application No. 62/254,825, filed on Nov. 13, 2015.

(51) Int. Cl.
*B01D 46/00* (2006.01)
*B01D 46/44* (2006.01)
*G11B 33/14* (2006.01)

(52) U.S. Cl.
CPC ..... *B01D 46/0068* (2013.01); *B01D 46/0086* (2013.01); *B01D 46/442* (2013.01); *B01D 46/444* (2013.01); *G11B 33/146* (2013.01)

(58) Field of Classification Search
CPC ............ B01D 46/0068; B01D 46/0086; B01D 46/442; B01D 46/444; G11B 33/146
See application file for complete search history.

(56) References Cited

U.S. PATENT DOCUMENTS

| 6,167,107 A | 12/2000 | Bates |
| 7,008,465 B2 | 3/2006 | Graham et al. |
| 2009/0249895 A1* | 10/2009 | Mahler ............... B01D 46/0086 73/863.23 |

OTHER PUBLICATIONS

TSI Incorporated. "Aerotrak® Portable Particle Counter Models 9310 & 9510." Models Specification, 2013, 2 pages.
Particle Measuring Systems, Inc. "Lasair® III Aerosol Particle Counter Models 310B, 310C, 350L, 5100." Models Specification, 2012, 2 pages.

* cited by examiner

*Primary Examiner* — Robert Clemente

(57) ABSTRACT

Aspects of the disclosure are directed to apparatuses and methods involving filters and detection of operation thereof. As may be consistent with one or more embodiments, an apparatus includes a fixture having mechanical components that hold a filter. Gas flow componentry operates with the fixture to eject particles from the filter by subjecting the filter to gas flow. A flow metering circuit meters the gas flow, and a particulate counter detects the ejected particles.

19 Claims, 7 Drawing Sheets

FILTRATION, FILTER CHARACTERIZATION, AND METHODS AND APPARATUSES THEREFOR

OVERVIEW

Various example embodiments are directed to methods and apparatuses involving filters and/or components that facilitate filter cleaning. Various such embodiments address issues that may relate to filter components as may be implemented for electrical and/or mechanical components such as those found in disc drives. For instance, burnish issues can be challenging to address for disc drives. Certain problems may arise from the presence of filter or other material on disc drive heads, such as when dirt or filter particulates contaminate the heads.

Various aspects of the present disclosure are directed to addressing such challenges. For instance, various embodiments are directed to filter characterization involving one or more of methods and apparatuses. Various such aspects involve using a fixture to hold a filter, with monitoring of flow through the filter and filter particulates ejected therefrom. These approaches can be used to test various filter materials, from which performance can be characterized and used in providing a filter design and/or a filter system design.

In accordance with particular embodiments, an apparatus includes a fixture having mechanical components configured and arranged to hold a filter, gas flow componentry configured and arranged with the fixture to eject particles from the filter by subjecting the filter to gas flow; a flow metering circuit configured and arranged to meter the gas flow, and a particulate detector configured and arranged to detect the ejected particles.

Various methods are implemented for assessing filters. In accordance with one or more embodiments, a filter is affixed with a fixture having mechanical components operable to hold the filter. Particles are ejected from the filter by subjecting the filter to gas flow provided via gas flow componentry. The gas flow is metered via a flow metering circuit, and the ejected particles are detected with a particulate counter.

The above overview is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, as depicted herein.

Figure 1:
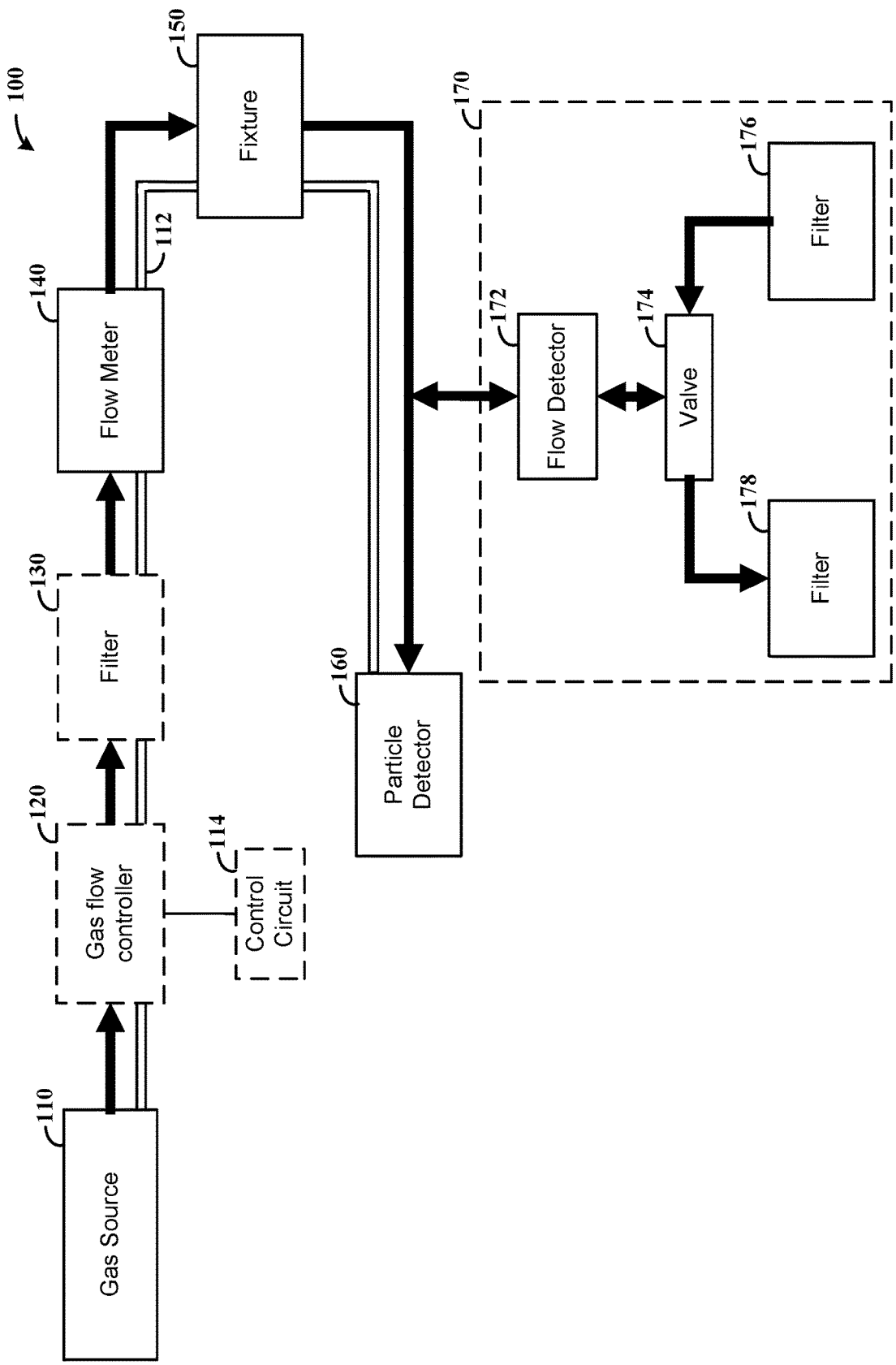
FIG. 1 shows an apparatus as may be implemented in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving filtering, filter cleaning and analysis. In certain implementations, aspects of the present disclosure have been shown to be beneficial when used in the context of analyzing filter performance for electronic componentry such as hard disc drives. While not necessarily so limited, various aspects may be appreciated through a discussion of examples using such exemplary contexts.

Various embodiments involve one or more of characterizing filter cleanliness, characterizing filter particulate ejection, and implementing cleaning procedures based on one of both steps of characterizing. In various implementations, particulates are ejected from filter material and the ejected particulates are detected, therein facilitating one or more characterizing steps. One or more embodiments may involve a flow metering circuit that detects a flow rate pertaining to gas flowing through a filter, a filter holder fixture, and a particulate counter.

Certain embodiments involve a method or apparatus, in which particles are ejected from a filter by subjecting the filter to gas flow (e.g., clean gas flow with specified flow conditions and time), and the ejected particles are detected (e.g., using an aerosol particle counter). In some implementations, the particles are ejected and counted by subjecting a first surface of the filter to clean gas flow, after which the particles are ejected and counted by subjecting a second surface of the filter to clean gas flow.

Another embodiment is directed to a data storage apparatus having a data storage device and a filter. The data storage device includes a storage medium and provides access to data stored at locations on the storage medium. This device may be implemented for example, as a hard disc drive or a solid state drive. The filter operates to filter particulates, and is designed in accordance with one or more embodiments characterized herein. In some implementations, the apparatus includes a filter bracket and other componentry that facilitate testing of the filer in place within the apparatus and with the data storage device.

Various embodiments are directed toward an apparatus including a filter, gas flow componentry, a flow metering circuit and a particulate detector. The fixture includes mechanical components that hold the filter, and the gas flow componentry operates with the fixture to subject the filter to gas flow and therein eject particles from the filter. A flow metering circuit meters the gas flow, and a particulate detector detects the ejected particles. The detected particles can thus be used to evaluate the operation of the filter, such as may relate to efficiency and/or lifespan. In some embodiments, the apparatus includes an electronic circuit that operates with the particulate counter and the flow metering circuit to generate and output a characterization of a condition of the filter, based on the metered gas flow and the detected ejected particles. For instance, a certain threshold level of particulates per flow measurement may be indicative of a failed or dirty filter, under which conditions the electronic circuit may generate a characterizing output.

The metering can be carried out in a variety of manners. For instance, a predetermined amount of gas can be metered into the filter, to suite a particular test application. This may, for example, involve metering an amount of gas corresponding to an expected flow, such as a high flow or burst, for operation of the filter in a real-time environment. Metering is carried out in this context with a direct relationship to testing to be performed. Such metering can thus be tailored to a filter type, application type, or both. The metering is further tied into the particulate detection, to achieve metering that corresponds to such detection.

The gas can be supplied to the filter using a variety of approaches. In some embodiments, the fixture and the gas flow componentry operate to subject the filter to a rapid pulse of gas and to use the rapid pulse of gas to eject the particles. For instance, a solenoid can be rapidly opened and closed, along a gas flow path that is coupled to a gas supply such as a pressurized tank. In some implementations, this approach is operated in connection with detection of particulates during a time period corresponding to the pulse. As may be implemented with one or more embodiments, the gas flow componentry can include a gas pathway including components such as gas tubes and connectors, a gas valve in the gas pathway, and a control circuit connected to the valve. The control circuit operates the gas valve to control an amount of gas flowing through the filter, such as by controlling flow or pulses as noted above. In some implementations, a first surface of the filter is subjected to gas flow, after which the particles are ejected and counted by subjecting a second surface of the filter to gas flow.

The fixture facilitates gas flow through the filter, and may accommodate a variety of filter types. For instance, the fixture may enclose the filter within a chamber, to direct the gas flow through the filter in the chamber, and to direct a gas flow including particulates from the filter to the flow metering circuit. In this context, the fixture may be shaped to securely hold the filter, and to seal the filter such that gas flowing in, and particles flowing out, are accounted for.

In particular implementations, the fixture includes first and second platens that operate to seal the filter therebetween, and that operate with the gas flow componentry to direct the air flow through the filter and to direct particulates being ejected from the filter to the particle detector. One or both of the first and second platens may couple to a plurality of different types of filter plates. Each type of filter plate may be tailored to hold and seal a particular filter having a geometry that is different than a geometry of filters that the other types of filter plates hold and seal.

In a more particular embodiment, an apparatus as noted above also includes a gas flow detector that detects an amount of gas flowing toward the particulate counter, and gas flow componentry coupled in a gas flow path between the fixture and the particle detector. This gas flow componentry may be utilized to add or remove gas from the system, to suit applications. For instance, in some embodiments, a portion of the gas flow exiting from the filter is exhausted in response to the gas flow detector indicating a gas flow to the particle detector that is less than a gas flow to the filter as metered by the gas flow metering circuit. Similarly, additional gas is supplied to the particle detector in response to the gas flow detector indicating a gas flow to the particle detector that is greater than a gas flow to the filter as metered by the gas flow metering circuit. An electronic circuit may operate with the particulate counter, the flow metering circuit and the gas flow detector to generate an output indicative of an amount of particles in the filter based one or more of the metered gas flow, the detected amount of gas flowing toward the particulate counter and including an amount of gas flowed toward or away from the particle detector by the gas flow componentry, and the detected ejected particles.

As noted above, testing may be carried out for filters utilized in specific applications, such as for hard disc drives. In this context, various embodiments involve simulating operation of the filter in a real-time environment. For instance, the fixture and gas flow componentry can be operated to replicate a particulate transfer mechanism from the filter for implementation of the filter within an apparatus, such as a hard disc drive including a base deck having a cavity, a storage medium in the base deck, a cover that encloses the cavity (with the base deck), and with the filter being within the cavity and adjacent the storage medium. This filter can thus operate to capture airborne particles flowing as a result of gas movement generated by rotation of the storage medium, and the testing can be carried out to characterize this operation.

In some implementations, the particulate counter provides an output indicative of a number of the detected ejected particles over a time period. The flow metering circuit provides an output indicative of a metered amount of the gas flowing through the filter over the time period. An output circuit provides an indication of efficacy of the filter for application in a specific application, such as with the hard disc drive noted above, based on a number of the detected ejected particles for a particular amount of the metered gas flow during the time period.

Particulate counters as noted herein can be implemented in one or more of a variety of approaches. In some embodiments, the particulate counter provides an output signal that characterizes the ejected particles. The output signal may, for example, be provided with information indicative of a number of detected ones of the ejected particles.

Various methods are implemented for assessing filters. In accordance with one or more embodiments, a filter is affixed with a fixture having mechanical components operable to hold the filter. Particles are ejected from the filter by subjecting the filter to gas flow provided via gas flow componentry. The gas flow is metered via a flow metering circuit, and the ejected particles are detected with a particulate counter. For instance, a gas valve may be operated to meter gas at a particular rate of flow through the filter, based upon a detected amount of gas flow (e.g., on an outlet side of the filter). An output indicative of one or more of filter cleanliness and filter particulate ejection characteristics can be generated, based on the detected ejected particles. A resulting value associated with the detected ejected particles can be adjusted based on an estimated amount of particles remaining from a previous test.

Gas flow can be adjusted, such as by utilizing exhaust or make-up gas flow as noted above. For instance, in response to detecting gas flow to the particle detector that is less than a gas flow to the filter via the metering, a portion of the gas flow exiting from the filter can be exhausted. In response to detecting gas flow to the particle detector that is greater than a gas flow to the filter via the metering, additional gas may be supplied to the particle detector. An output indicative of an amount of particles in the filter can be generated in this context, based on the metered gas flow, the detected amount of gas flowing toward the particulate counter (including an amount of gas flowed toward or away from the particle detector by the gas flow componentry), and the detected ejected particles.

Various description, figures and flow schematics in the underlying provisional application, including the Appendix section thereof, characterize aspects of one or more embodiments (see U.S. Provisional Application Ser. No. 62/254,825, which is fully incorporated herein by reference). For instance, various depictions show flow diagrams, componentry and other aspects as may be implemented in accordance with one or more embodiments. Other figures as follows also depict one or more embodiments, some of which may be implemented consistently with one or more aspects as shown in the underlying provisional application.

FIG. 1 shows an apparatus 100 as may be implemented in accordance with one or more embodiments. The apparatus 100 includes gas flow componentry, flow meter 140, fixture 150 and particle detector 160. The gas flow componentry may include a gas source 110 such as a pressurized chamber and/or a compressor, and a gas pathway including piping or tubing 112. The flow meter 140 is operable for metering flow of gas, the fixture 150 holds one or more types of filters while the gas flows through the filter(s), and the particle detector 160 detects particles in the gas flowing through the filter(s). The fixture 150 may be implemented with one or more fixture designs such as those shown in mechanical drawings in the Appendix portion of the underlying provisional patent application referenced above. Similarly, example flow rates and other equipment noted in the Appendix, such as the indicated particle detectors/counters and sampling rates, can be used with the apparatus 100.

The particle detector 160 may, for example, provide an output signal characterizing detected particles. In some implementations, componentry within and/or external from the particle detector operates to provide a characterization of one or more filters in the fixture 150 based on the detected particles, such as by determining a number of particles dislodged from a filter over a given time.

In certain embodiments, such componentry as noted in FIG. 1 operates to apply a correction to any number of particles detected based upon a flow rate detected at flow meter 140, relative to a flow rate of gas at the particle detector 160 (or, e.g., in-line after the fixture 150, such as with flow detector 172 as discussed below). For instance, where flow through the particle detector 160 is less than flow through the fixture 150, a ratio of the respective volumetric flows can be generated and applied to a number of particles detected to provide an estimate of actual particles dislodged from the filter. As an example, if the amount of flow through the fixture is twice the amount of flow through the particle detector 160, a factor of two may be applied to a number of detected particles.

In some embodiments, a particle count is adjusted based on an estimated amount of particles remaining in a system from a previous test. For instance, an estimate can be provided by operating the system 100 with a standard test filter, removing the filter, and then detecting particles while operating the system again. This estimate can later be used when testing successive filters, by reducing a number of particles detected over a commensurate time by an amount corresponding to such an estimate.

A cleaning procedure can be implemented in accordance with the above or other embodiments, based on detected particles. For example, with the system 100 being operated without a filter, particles can be detected. If the detected particles exceed a threshold, a cleaning procedure can be initiated.

In various embodiments, one or more embodiments utilize one or more optional components shown, including a gas flow control circuit 114, a gas flow controller 120, and a filter 130 for filtering incoming gas. The gas flow controller may include, for example, a valve and/or pressure regulator. The control circuit 114 may include a computer or other circuit programmed or configured to provide a signal, such as an air signal or electrical signal, to the gas flow controller 120 such as for opening or closing a valve and/or adjusting a pressure regulator.

A further makeup/blow-off component 170 may be implemented in accordance with one or more embodiments. A flow detector 172 is coupled to the gas flow componentry 112 and operates to detect gas flow conditions. Valve 174 is coupled and operated (e.g., via control circuitry, which may be implemented with the flow detector 172) to provide makeup air in response to detecting that gas flowing to the particle detector 160 is less than gas flowing to the fixture 150 (and a filter or filters therein). Valve 174 is also coupled and operated to blow-off gas from the gas flow componentry 112 in response to detecting a gas flow to the particle detector that is greater than gas flow to the fixture 150. This makeup/blow-off may be facilitated via respective filters 176 and 178.

FIGS. 2-7 show filter analysis apparatuses, as may be implemented in connection with one or more embodiments. Each of these figures may be implemented with one or more other figures, or as a separate embodiment, while certain reference numerals are shared between figures for similar componentry. The embodiments in these figures may also be implemented with or as the fixture 150 of FIG. 1. Various embodiments may utilize such a fixture or fixtures with a test approach, with one or both surfaces of a filter being exposed to an incoming air or gas flow that passes through the filter via the respective surface, with particulate counts being collected for flow in one or both directions.

Figure 2:
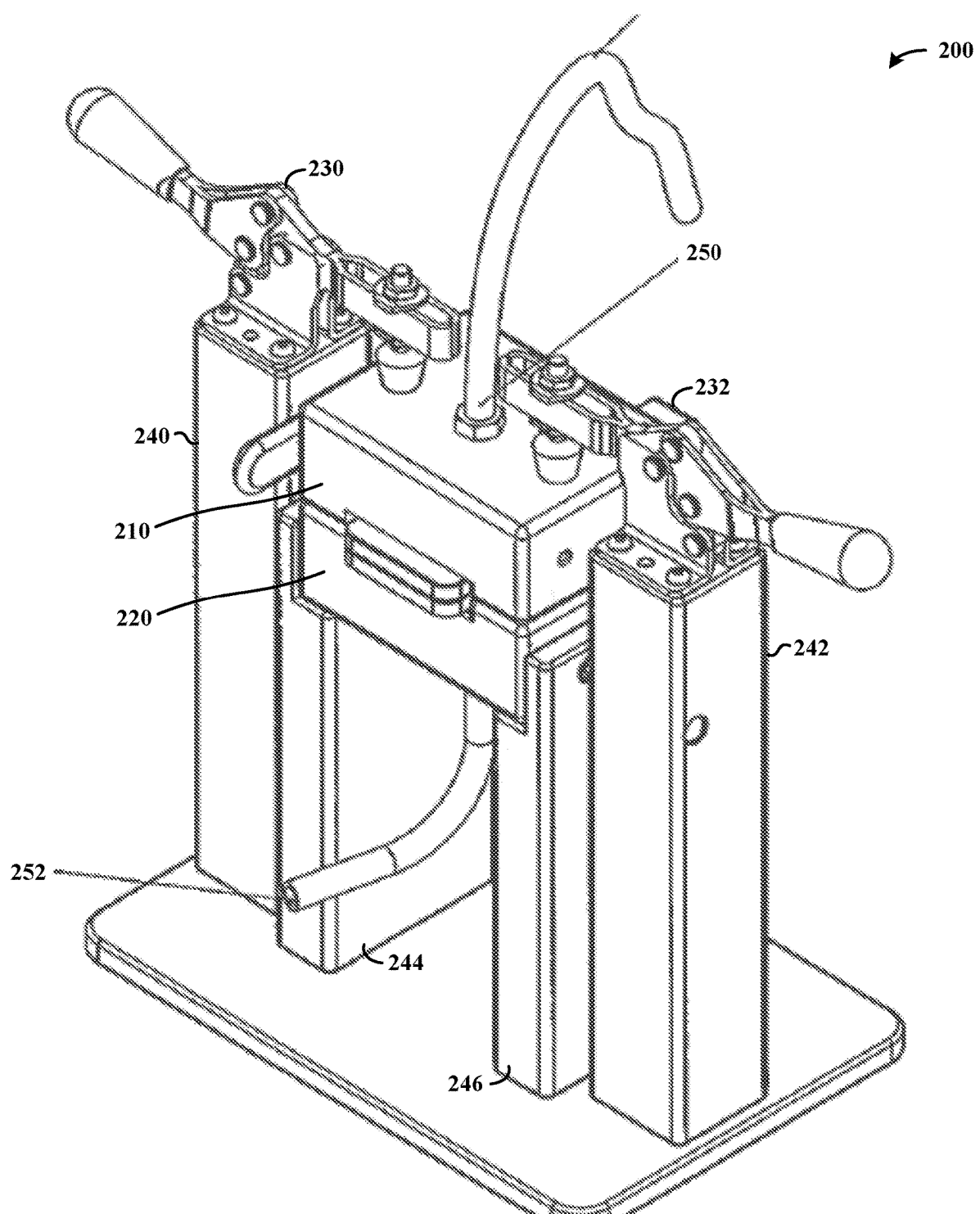
FIG. 2 shows an apparatus having upper and lower platens, as may be implemented in accordance with one or more embodiments.

Referring to FIG. 2, an apparatus 200 includes upper platen 210 and lower platen 220, respectively operable with one another to hold and enclose one or more filters. Clamps 230 and 232 are respectively coupled to support structures 240 and 242 as well as the upper platen 210, and are operable to clamp the upper platen 210 to the lower platen 220, the latter of which can be affixed to the support structures 240, 242, 244 and 246. Gas flow componentry includes gas lines 250 and 252, respectively for supplying gas to and/or drawing particulate-laden gas from one or more filters held by the platens. For instance, gas may be supplied via gas line 250, passed through a filter held between platens 210 and 220, and exhausted along with dislodged particulates via gas line 252. In other embodiments, gas is flowed in the opposite direction, with inlet gas supplied to the filter via gas line 252 and particulate-laden gas exhausted via gas line 250. In further embodiments, gas may be flowed by a filter within the platens 210/220 in a first direction, followed by flowing gas by the filter in an opposite direction, in which the gas lines 250 and 252 are respectively used to both supply and exhaust gas.

Figure 3:
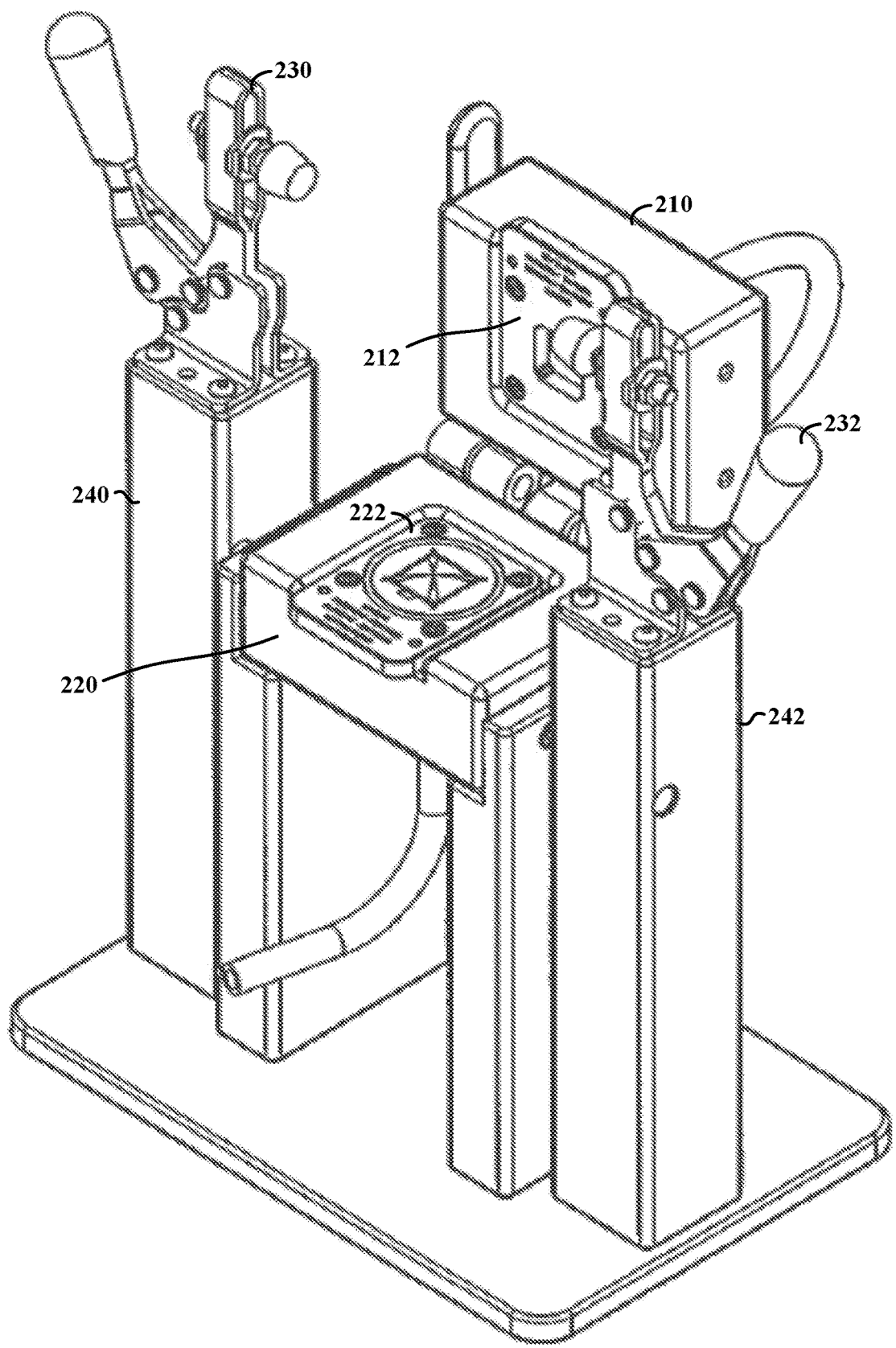
FIG. 3 shows an apparatus with the clamps disengaged and a platen rotated, as may be implemented in accordance with one or more embodiments.

Referring to FIG. 3, the apparatus is shown with the clamps 230 and 232 disengaged and platen 210 rotated into an open position. Platen 210 includes a filter plate cover 212, and platen 222 is shown with a filter holding plate 222.

Accordingly, when the platens 210/220 are clamped together, the filter holding plate 222 and any filter therein are secured with the filter sealed to allow gas to flow through. In various embodiments, the arrangement shown is reversed with the filter holding plate 222 coupled to the upper platen 210, and the lower platen 220 including a cover plate.

Figure 4:
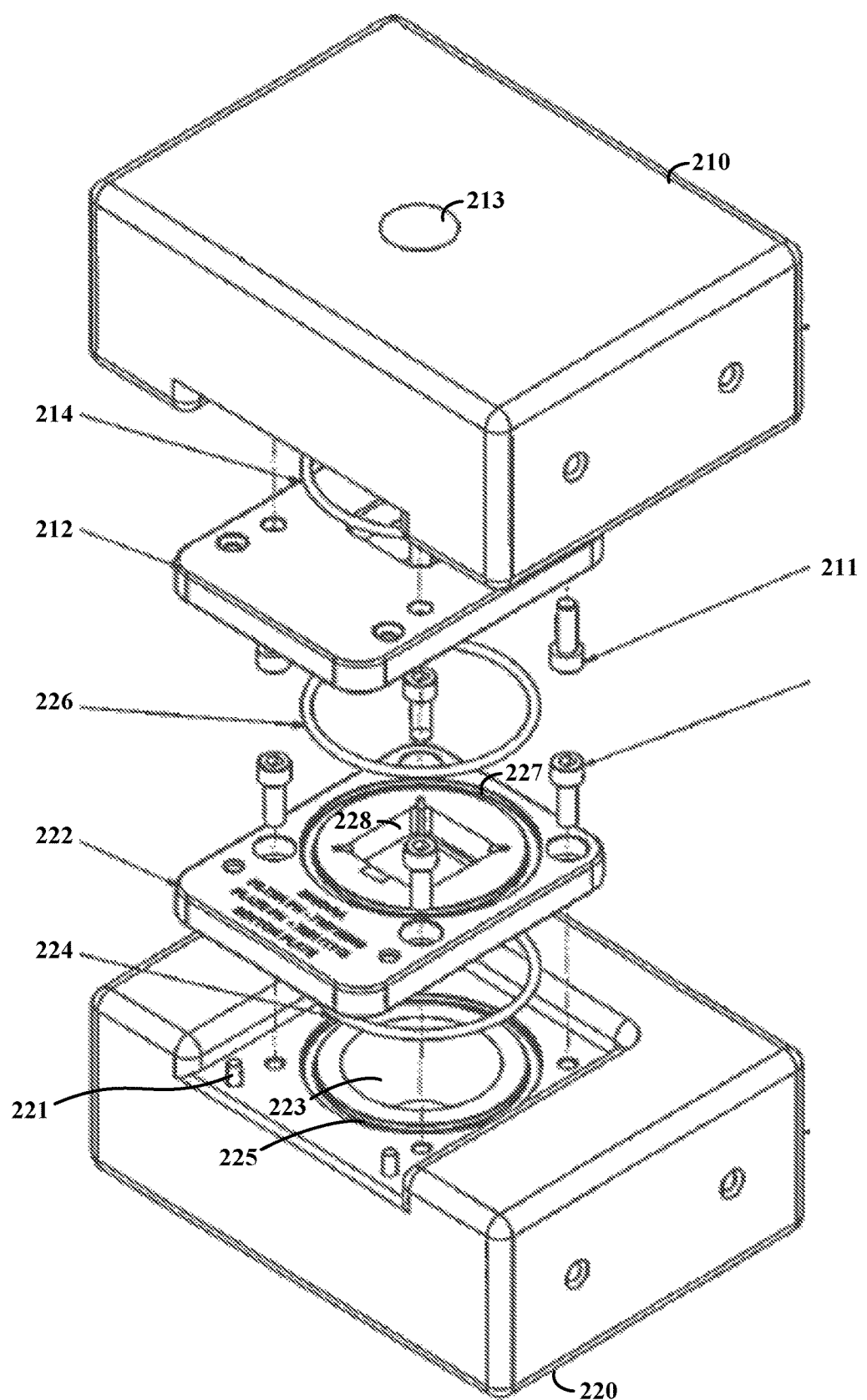
FIG. 4 shows an assembly view of a platen, as may be implemented in accordance with one or more embodiments.

FIG. 4 shows an assembly view of a platen such as that shown in FIG. 3, useful for holding a filter and as may be implemented with one or more embodiments. A cover plate 212 is shown disassembled from a recess in upper platen 210, and a filter plate 222 is shown disassembled from lower platen 220. An opening 213 feeds gas into the upper platen 210, and opening 223 exhausts gas through the lower platen 220. Alignment pins, including pin 221, can be utilized to align the filter plate 222 and, similarly, the cover plate 212 respectively with the lower platen 220 and upper platen 210. An O-ring type seal may be used to seal respective openings. By way of example, O-ring 224 is shown disassembled from a recess 225 in the lower platen 220, in which the O-ring can be placed and used to form a seal with an underside of the filter plate 222. O-ring 226 is shown disassembled from recess 227 in the filter plate 222. A filter opening 228 is shaped to provide flow through filters sealed by the platens, with edges of the filter around the opening. While the opening 228 is square, various other shapes may be implemented. A similar recess for O-ring 226 may be formed in cover plate 212 and/or cover plate 212 may provide a flat surface upon which the O-ring seals. O-ring 214 is shown disassembled from the upper platen 210, which may include a recess such as the others shown, for sealing around the opening 213 through the upper platen and against the cover plate 212. A plurality of fasteners, including fastener 211, are shown; however a variety of different types of fasteners and of fastening approaches can be utilized.

Figure 5:
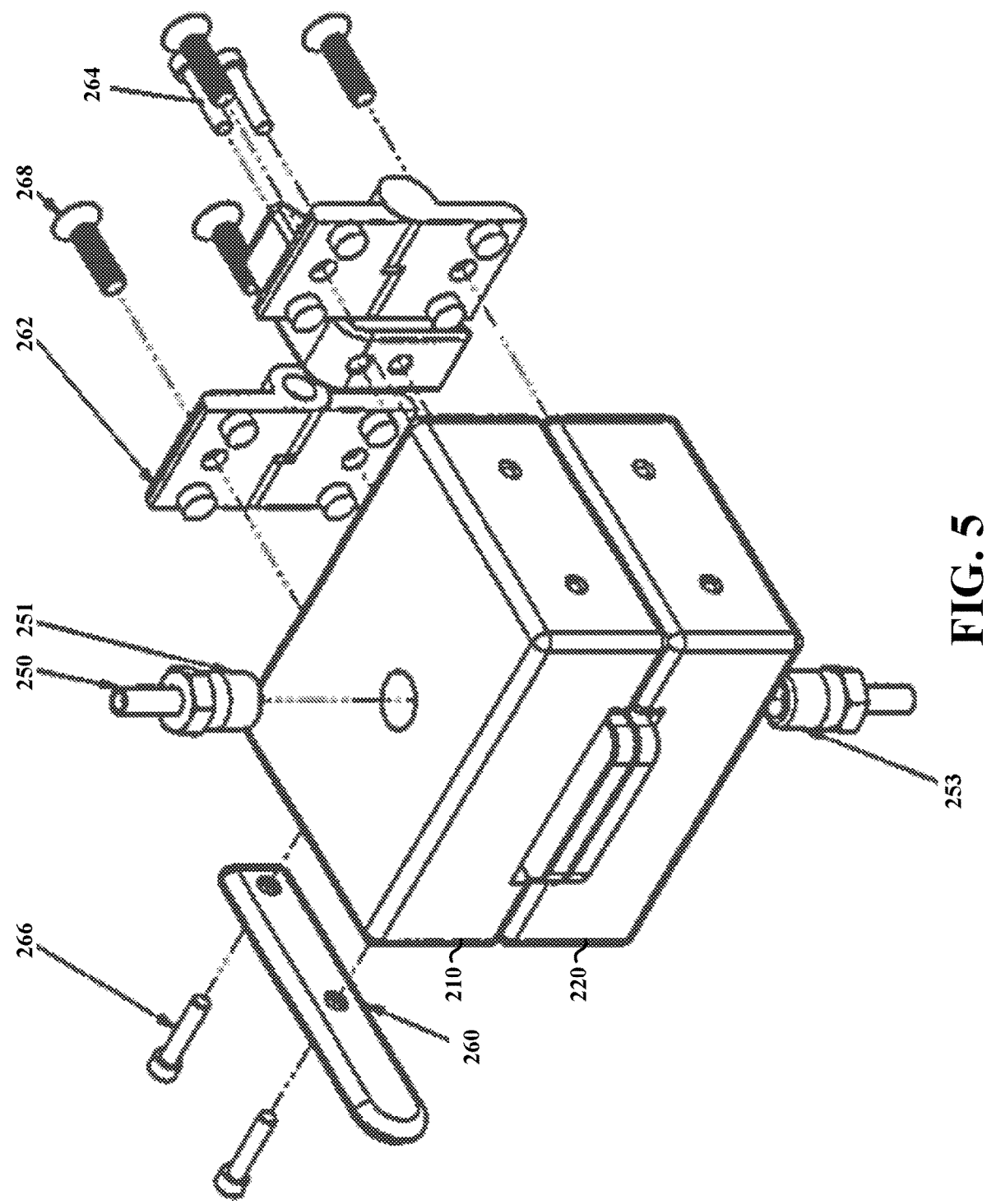
FIG. 5 shows an assembly view including respective platens, as may be implemented in accordance with one or more embodiments.
Figure 6:
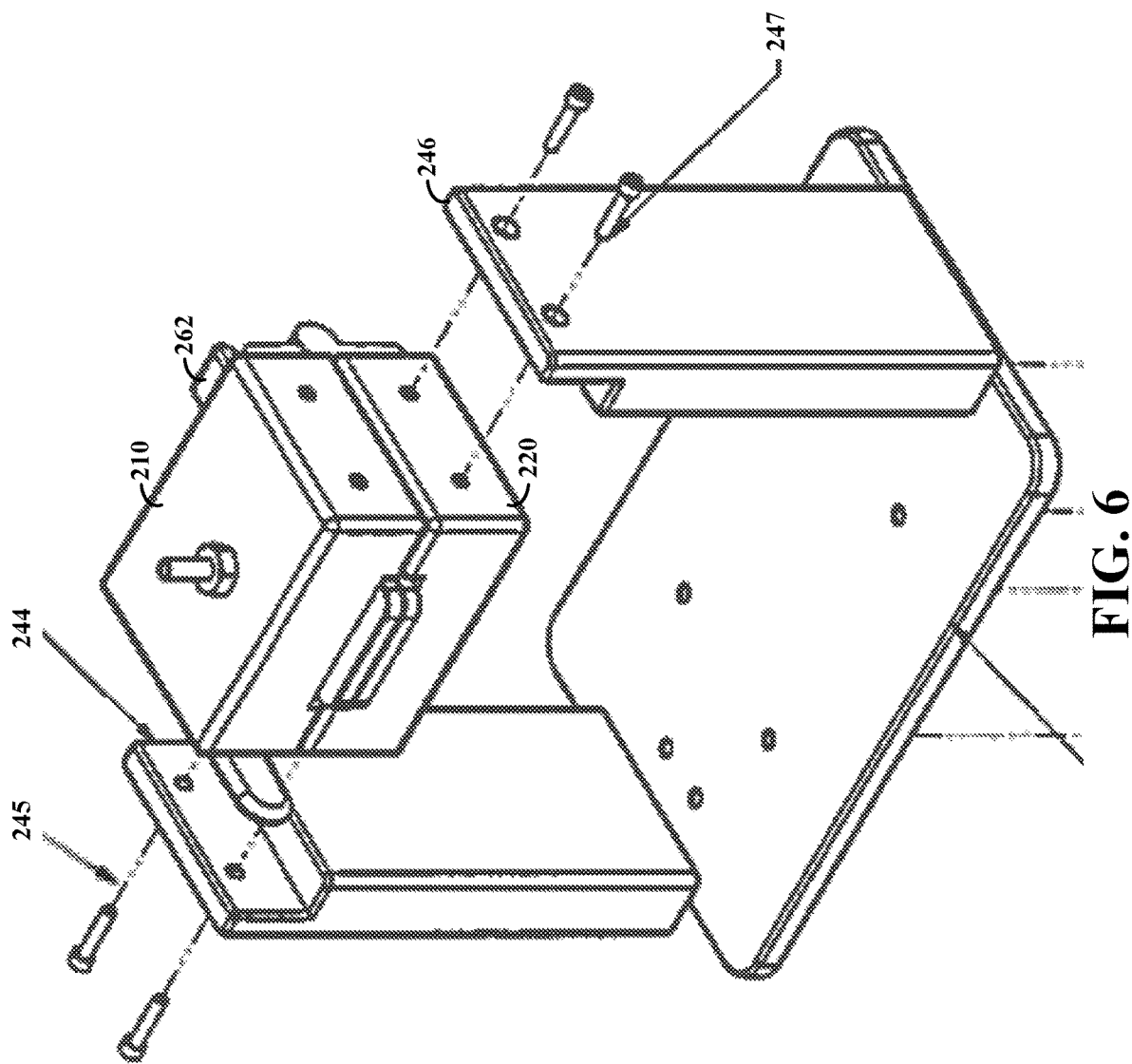
FIG. 6 shows a further assembly view of an apparatus, as may be implemented in accordance with one or more embodiments.

FIG. 5 shows an assembly view including respective platens 210 and 220, with exemplary bracketry 260, hinge 262, and fasteners with fasteners 264, 266 and 268 labeled by example. Fittings 251 and 253 respectively couple gas lines to the respective platens 210 and 220. FIG. 6 shows a further assembly view, with the hinge 262 coupled to platens 210 and 220, and with the platens and bracketry 260 shown disassembled from supports 244 and 246. Fasteners 245 and 247 are shown by way of example.

Figure 7:
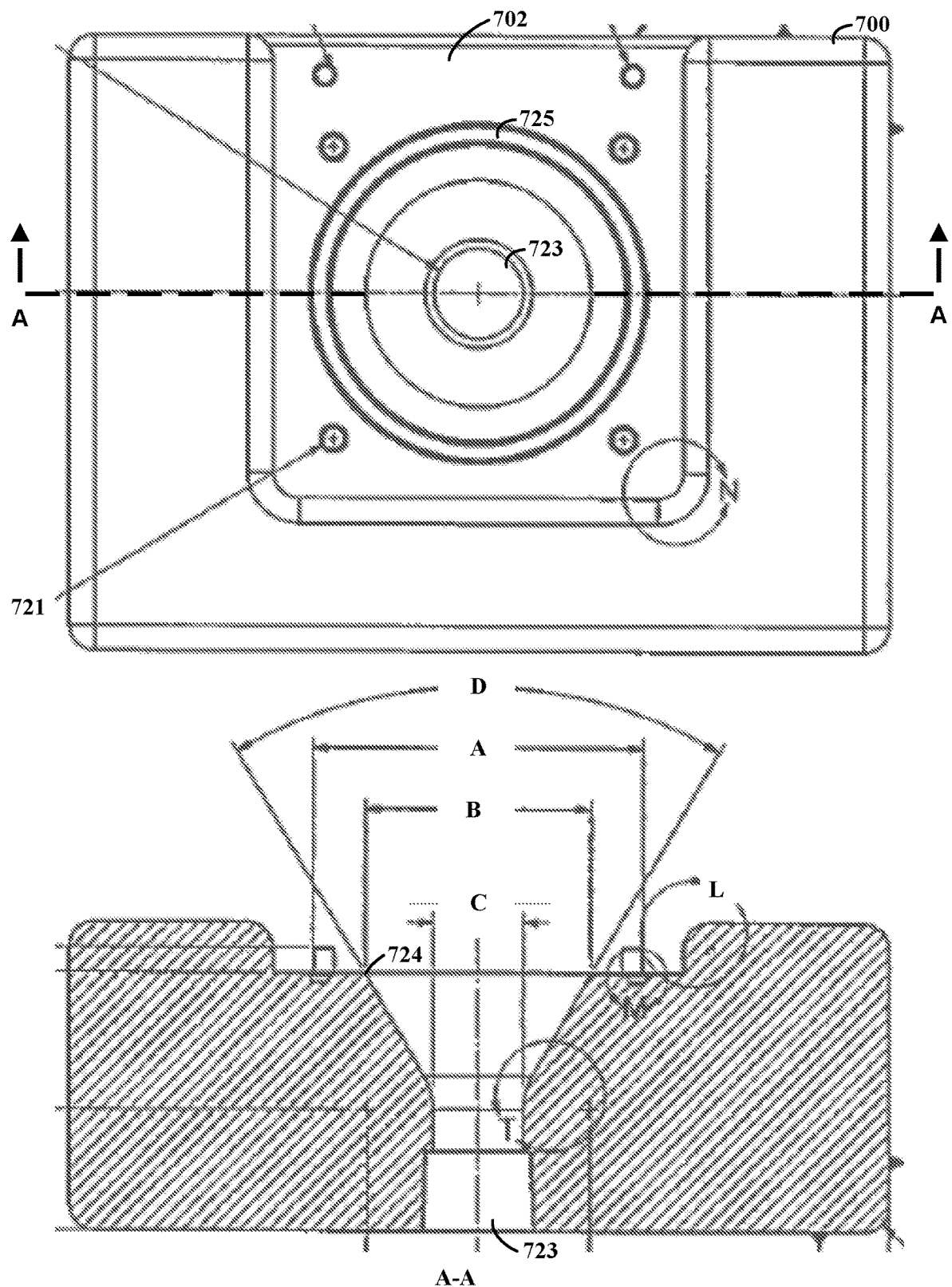
FIG. 7 shows a platen and a cross-section thereof, as may be implemented in accordance with one or more embodiments.

A variety of geometries can be implemented for directing gas flow through one or more filters within platens as claimed. FIG. 7 shows a platen 700 and a cross-section A-A thereof, as may be implemented in accordance with one or more embodiments. For instance, platen 700 can be implemented for one or both of platens 210 and 220 as shown in FIGS. 2-6. The platen 700 includes a recessed area 702 for accepting a filter plate or cover plate, and a channel 725 for accepting an O-ring. An opening therein at 723 is shown, which tapers inward as the opening extends from a surface of the recessed area 702, with the taper beginning as shown cross-section A-A at 724. Fillets of varying degree are implemented at transitions shown, to facilitate flow. A variety of alignment pins may be used, with alignment pin 721 labeled by way of example. Various dimensions as shown can be sized to suit particular applications.

Based upon the above discussion and illustrations, those skilled in the art will readily recognize that various modifications and changes may be made to the present disclosure without strictly following the exemplary embodiments and applications illustrated and described herein. For example, different types of fixtures can be used for monitoring filters, separate from and/or during implementation. For instance, fixtures can be used to monitor flow through a filter while the filter is in place with a hard disc drive, with further componentry that monitors particulates expelled from the filter. Further, while various example materials, sizes and arrangements are shown in the figures and/or described, such aspects may be implemented in embodiments involving other materials, sizes or arrangements. Such modifications do not depart from the true spirit and scope of the present disclosure, including that set forth in the following claims.

What is claimed is:

1. An apparatus comprising:
    a fixture having mechanical components configured and arranged to hold a filter;
    gas flow componentry, including control circuitry configured and arranged with the fixture to eject embedded particles from the filter by subjecting the filter to gas flow including a pulse of gas sufficient to dislodge the particles embedded in the filter;
    a flow metering circuit configured and arranged to meter the gas flow; and
    a particulate detector configured and arranged to detect the ejected particles.

2. The apparatus of claim 1, further including an electronic circuit configured and arranged with the particulate detector and the flow metering circuit to generate and output a characterization of a condition of the filter, based on the metered gas flow and the detected ejected particles.

3. The apparatus of claim 1, wherein the fixture is configured and arranged to enclose the filter within a chamber, to direct the gas flow through the filter in the chamber, and to direct a gas flow including particulates from the filter to the flow metering circuit.

4. The apparatus of claim 1, further including:
    a gas flow detector configured and arranged to detect an amount of gas flowing toward the particulate-detector;
    gas flow componentry coupled in a gas flow path between the fixture and the particulate detector and configured and arranged to:
        in response to the gas flow detector indicating a gas flow to the particulate detector that is less than a gas flow to the filter as metered by the gas flow metering circuit, supply additional gas to the particulate detector, and
        in response to the gas flow detector indicating a gas flow to the particulate detector that is greater than a gas flow to the filter as metered by the gas flow metering circuit, exhaust a portion of the gas flow exiting from the filter; and
    an electronic circuit configured and arranged with the particulate-detector, the flow metering circuit and the gas flow detector to generate an output indicative of an amount of particles in the filter based on: the metered gas flow, the detected amount of gas flowing toward the particulate-detector and including an amount of gas flowed toward or away from the particulate detector by the gas flow componentry, and the detected ejected particles.

5. The apparatus of claim 1, wherein the fixture and gas flow componentry are configured and arranged to replicate a particulate transfer mechanism from the filter for implementation of the filter within a hard disc drive including:
    a base deck having a cavity;
    a storage medium in the base deck;
    a cover that is configured and arranged with the base deck to enclose the cavity; and the filter within the cavity and adjacent the storage medium to capture airborne particles flowing as a result of air movement generated by rotation of the storage medium.

6. The apparatus of claim 5,
wherein the particulate-detector is configured and arranged to provide an output indicative of a number of the detected ejected particles over a time period;
wherein the flow metering circuit is configured and arranged to provide an output indicative of a metered amount of the gas flowing through the filter over the time period; and
further including an output circuit configured and arranged to provide an indication of efficacy of the filter for application in the hard disc drive, based on a number of the detected ejected particles for a particular amount of the metered gas flow during the time period.

7. The apparatus of claim 1, wherein the particulate-detector is configured and arranged to provide an output signal that characterizes the ejected particles.

8. The apparatus of claim 7, wherein the particulate-detector is configured and arranged to provide the output signal with information indicative of a number of detected ones of the ejected particles.

9. The apparatus of claim 1, wherein the particulate-detector is configured and arranged to eject the particles by subjecting a first surface of the filter to gas flow, after which the particles are ejected and counted by subjecting a second surface of the filter to gas flow.

10. The apparatus of claim 1, wherein the fixture includes:
a first platen; and
a second platen configured and arranged with the first platen to seal the filter between the first platen and the second platen, the first platen and second platen being configured and arranged with the gas flow componentry to direct the air flow through the filter and to direct particulates being ejected from the filter to the particulate detector.

11. The apparatus of claim 10, wherein at least one of the first and second platen is configured and arrange to couple to a plurality of different types of filter plates, each type of filter plate being configured and arranged to hold and seal a filter having a geometry that is different than a geometry of filters that the other types of filter plates are configured and arranged to hold and seal.

12. The apparatus of claim 1, further including at least one inlet filter configured and arranged to filter the gas provided to the filter by the gas flow componentry.

13. An apparatus comprising:
a fixture having mechanical components configured and arranged to hold a filter;
gas flow componentry including a gas pathway, a gas valve in the gas pathway, and a control circuit connected to the valve and configured and arranged to operate the gas valve to control an amount of gas flowing through the filter to eject particles from the filter by subjecting the filter to gas flow;
a flow metering circuit configured and arranged to meter the gas flow; and
a particulate detector configured and arranged to detect the ejected particles.

14. A method comprising:
affixing a filter with a fixture having mechanical components operable to hold a filter;
ejecting particles from the filter by subjecting the filter to gas flow provided via gas flow componentry;
metering the gas flow via a flow metering circuit; and
detecting the ejected particles with a particulate counter.

15. The method of claim 14, further including generating an output indicative of one or more of filter cleanliness and filter particulate ejection characteristics, based on the detected ejected particles.

16. The method of claim 14, wherein subjecting the filter to gas flow includes controlling the gas flow by operating a gas valve based upon a detected amount of gas flow.

17. The method of claim 14, further including
in response to detecting gas flow to the particulate counter that is less than a gas flow to the filter via the metering, supplying additional gas to the particulate counter; and
in response to detecting gas flow to the particulate counter that is greater than a gas flow to the filter via the metering, exhausting a portion of the gas flow exiting from the filter.

18. The method of claim 17, further including generating an output indicative of an amount of particles in the filter based on: the metered gas flow, the detected amount of gas flowing toward the particulate counter and including an amount of gas flowed toward or away from the particulate counter by the gas flow componentry, and the detected ejected particles.

19. The method of claim 14, further including adjusting a value associated with the detected ejected particles based on an estimated amount of particles remaining from a previous test.

* * * * *